United States Patent
Legerton et al.

(10) Patent No.: US 12,523,890 B2
(45) Date of Patent: *Jan. 13, 2026

(54) SYSTEMS, APPARATUS, AND METHODS FOR REGULATING REFRACTIVE ERROR DEVELOPMENT THROUGH THE MODULATION OF PERIPHERAL DISTORTION

(71) Applicant: SHENYANG KANGENDE MEDICAL SCIENCE AND TECHNOLOGY CO., LTD, Shenyang (CN)

(72) Inventors: Jerome A. Legerton, Jupiter Inlet Colony, FL (US); Jidong Liu, Shenyang (CN); Gaozhi Liu, Shenyang (CN)

(73) Assignee: Shenyang Kangende Medical Science and Technology Co., Ltd, Shenyang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/558,135

(22) PCT Filed: Jul. 7, 2021

(86) PCT No.: PCT/CN2021/104965
§ 371 (c)(1),
(2) Date: Oct. 30, 2023

(87) PCT Pub. No.: WO2023/279282
PCT Pub. Date: Jan. 12, 2023

(65) Prior Publication Data
US 2024/0085725 A1    Mar. 14, 2024

(51) Int. Cl.
*G02C 7/04*    (2006.01)

(52) U.S. Cl.
CPC ......... *G02C 7/041* (2013.01); *G02C 2202/24* (2013.01)

(58) Field of Classification Search
CPC .......... G02C 7/022; G02C 7/04; G02C 7/041; G02C 2202/24

(Continued)

(56) References Cited

U.S. PATENT DOCUMENTS

| | | | | |
|---|---|---|---|---|
| 5,422,687 A | * | 6/1995 | Tanaka | G02C 7/042 351/159.48 |
| 5,815,239 A | * | 9/1998 | Chapman | G02C 7/04 351/159.74 |

(Continued)

FOREIGN PATENT DOCUMENTS

| WO | WO 2020/229367 | 11/2020 |
|---|---|---|
| WO | WO 2021/056059 | 4/2021 |

OTHER PUBLICATIONS

Meister, Darryl, and James E Sheedy. Introduction to Ophthalmic Optics. Carl Zeiss Vision, 2008 (Year: 2008).*

(Continued)

*Primary Examiner* — Zachary W Wilkes
(74) *Attorney, Agent, or Firm* — Sheppard Mullin Richter & Hampton LLP

(57) ABSTRACT

In general, one aspect disclosed features a lens comprising: a central zone having an optical center corresponding to the visual axis of an eye of a patient; and a peripheral zone peripheral to the central zone and comprising: a first zone having a first thickness, and a second zone having a second thickness, wherein: the second thickness varies from the first thickness, and a distance from the second zone to the optical center of the central zone is selected to generate pincushion distortion or barrel distortion in the eye of the patient.

11 Claims, 11 Drawing Sheets

(58) Field of Classification Search
USPC .......................... 351/159.1, 159.05–159.21
See application file for complete search history.

(56) References Cited

U.S. PATENT DOCUMENTS

| | | | | |
|---|---|---|---|---|
| 6,457,826 | B1* | 10/2002 | Lett | G02C 7/042 |
| | | | | 351/159.05 |
| 7,025,460 | B2* | 4/2006 | Smitth | G02C 7/04 |
| | | | | 351/205 |
| 7,401,922 | B2 | 7/2008 | Legerton | |
| 7,665,842 | B2* | 2/2010 | Ho | G02C 7/02 |
| | | | | 351/159.79 |
| 7,832,859 | B2* | 11/2010 | Phillips | G02C 7/044 |
| | | | | 351/159.1 |
| 8,057,034 | B2* | 11/2011 | Ho | G02C 7/042 |
| | | | | 351/159.14 |
| 8,950,859 | B2* | 2/2015 | Tung | G02C 7/044 |
| | | | | 351/159.01 |
| 8,950,860 | B2* | 2/2015 | Tse | G02C 7/042 |
| | | | | 351/159.41 |
| 8,992,010 | B2* | 3/2015 | Ho | G02C 7/04 |
| | | | | 351/159.79 |
| 9,360,683 | B2* | 6/2016 | Buehren | G02C 7/041 |
| 9,594,257 | B2* | 3/2017 | Martinez | G02C 7/041 |
| 10,001,660 | B1* | 6/2018 | Chow | G02C 7/027 |
| 10,429,670 | B2* | 10/2019 | Newman | G02C 7/022 |
| 10,444,542 | B2* | 10/2019 | Goto | G02C 7/048 |
| 10,877,294 | B2* | 12/2020 | Lau | G02C 7/06 |
| 11,454,825 | B2* | 9/2022 | Paune Fabre | G02C 7/047 |
| 2005/0105047 | A1* | 5/2005 | Smitth | G02C 7/04 |
| | | | | 351/159.07 |
| 2007/0159601 | A1 | 7/2007 | Ho et al. | |
| 2011/0153012 | A1* | 6/2011 | Legerton | G02C 7/04 |
| | | | | 351/159.23 |
| 2012/0320334 | A1* | 12/2012 | Ho | G02C 7/044 |
| | | | | 351/159.23 |
| 2013/0278887 | A1 | 10/2013 | Legerton | |
| 2014/0375949 | A1* | 12/2014 | Buehren | G02C 7/027 |
| | | | | 351/159.05 |
| 2016/0370602 | A1* | 12/2016 | Fujikado | G02C 7/044 |
| 2017/0090216 | A1* | 3/2017 | Goto | G02C 7/047 |
| 2017/0184875 | A1* | 6/2017 | Newman | G02C 7/022 |
| 2018/0329227 | A1* | 11/2018 | Chow | G02C 7/047 |
| 2019/0155055 | A1* | 5/2019 | Lin | G02C 7/041 |
| 2019/0302481 | A1 | 10/2019 | Zhou et al. | |
| 2020/0133024 | A1* | 4/2020 | Paune Fabre | G02C 7/047 |
| 2020/0409179 | A1* | 12/2020 | Wu | G02C 7/061 |
| 2021/0103162 | A1* | 4/2021 | Lin | G02C 7/041 |
| 2021/0311326 | A1* | 10/2021 | Wyss | G02C 7/04 |
| 2023/0128895 | A1* | 4/2023 | Gacoin | B29D 11/00932 |
| | | | | 351/159.41 |
| 2023/0273458 | A1* | 8/2023 | Qi | G02C 7/022 |
| | | | | 351/159.74 |

OTHER PUBLICATIONS

International Search Report and Written Opinion mailed Mar. 28, 2022 for PCT/CN2021/104965.
International Preliminary Report on Patentability mailed Oct. 7, 2023 for PCT/CN2021/104965.

* cited by examiner

SYSTEMS, APPARATUS, AND METHODS FOR REGULATING REFRACTIVE ERROR DEVELOPMENT THROUGH THE MODULATION OF PERIPHERAL DISTORTION

CROSS-REFERENCE TO RELATED APPLICATIONS

This application is a National Phase application under 35 U.S.C. § 371 of PCT Application No. PCT/CN2021/104965, filed Jul. 7, 2021, and entitled "SYSTEMS, APPARATUS, AND METHODS FOR REGULATING REFRACTIVE ERROR DEVELOPMENT THROUGH THE MODULATION OF PERIPHERAL DISTORTION", which is incorporated herein by reference in its entirety.

DESCRIPTION OF RELATED ART

The disclosed technology relates generally to lenses, and more particularly some embodiments relate to lenses and for controlling the progression of or eliminating refractive errors.

SUMMARY

In general, one aspect disclosed features a lens comprising: a central zone having an optical center corresponding to the visual axis of an eye of a patient; and a peripheral zone peripheral to the central zone and comprising: a first zone having a first thickness, and a second zone having a second thickness, wherein: the second thickness varies from the first thickness, and a distance from the second zone of the peripheral zone to the optical center of the central zone is selected to generate pincushion distortion or barrel distortion in the eye of the patient.

Embodiments of the lens may include one or more of the following features. In some embodiments, the second zone comprises at least one of: a raised area on an anterior surface of the lens; a raised area on a posterior surface of the lens; a depressed area on an anterior surface of the lens; or a depressed area on a posterior surface of the lens. In some embodiments, the second thickness is selected to generate peripheral defocus in the eye of the patient. In some embodiments, the central zone includes a conic-section curve configured to generate a spherical aberration in the eye of the patient. In some embodiments, the spherical aberration generated in the eye of the patient is one of a positive, negative or neutral spherical aberration. In some embodiments, the lens is rotationally stabilized to allow for at least one of: different optical powers in two or more semi-meridians; different spherical aberration generated in two or more semi-meridians; different peripheral defocus in two or more semi-meridians; or different ocular distortion in two or more semi-meridians. In some embodiments, the second thickness in the second zone is selected to generate a different peripheral defocus in the eye of the patient in two or more semi-meridians. In some embodiments, the distance of the second zone in the peripheral zone to the center of the central zone is selected to generate different amounts of pincushion distortion or barrel distortion in the eye of the patient in two or more semi-meridians.

In general, one aspect disclosed features a lens comprising: a central zone having an optical center corresponding to the visual axis of an eye of a patient; and a peripheral zone peripheral to the central zone and comprising: a first zone having a first index of refraction, and a second zone having a second index of refraction, wherein: the second index of refraction varies from the first index of refraction, and a distance from the second zone of the peripheral zone to the optical center of the central zone is selected to generate pincushion distortion or barrel distortion in the eye of the patient.

In general, one aspect disclosed features a method for defining a lens to be manufactured for an eye of a patient, the method comprising: selecting a central zone having an optical center corresponding to the visual axis of an eye of the patient; and selecting a peripheral zone peripheral to the central zone; and selecting, for the peripheral zone: a first zone having a first thickness, and a second zone having a second thickness, wherein: the second thickness varies from the first thickness, and a distance from the second zone to the optical center of the central zone is selected to generate pincushion distortion or barrel distortion in the eye of the patient.

Embodiments of the method may include one or more of the following features. Some embodiments comprise selecting, for the second zone, at least one of: a raised area on an anterior surface of the lens; a raised area on a posterior surface of the lens; a depressed area on an anterior surface of the lens; or a depressed area on a posterior surface of the lens. Some embodiments comprise selecting the second thickness to generate peripheral defocus in the eye of the patient. Some embodiments comprise selecting, for the central zone, a conic-section curve to generate a spherical aberration in the eye of the patient. In some embodiments, the spherical aberration generated in the eye of the patient is one of a positive, negative or neutral spherical aberration. Some embodiments comprise rotationally stabilizing lens to allow for at least one of: different optical powers in two or more semi-meridians; different spherical aberration generated in two or more semi-meridians; different peripheral defocus in two or more semi-meridians; or different ocular distortion in two or more semi-meridians. Some embodiments comprise selecting the second thickness in the second zone of the peripheral zone to generate a different peripheral defocus in the eye of the patient in two or more semi-meridians. Some embodiments comprise selecting the distance of the second zone of the peripheral zone to the center of the central zone to generate different amounts of pincushion distortion or barrel distortion in the eye of the patient in two or more semi-meridians.

In general, one aspect disclosed features a method for defining a lens to be manufactured for an eye of a patient, the method comprising: selecting a central zone having a center corresponding to a visual axis of the eye of the patient; selecting a peripheral zone peripheral to the central zone; and selecting, for the peripheral zone: a first zone having a first index of refraction, and a second zone having a second index of refraction, wherein: the second index of refraction varies from the first index of refraction, and a distance from the second zone of the peripheral zone to the optical center of the central zone is selected to generate pincushion distortion or barrel distortion in the eye of the patient.

Embodiments of the method may include one or more of the following features. Some embodiments comprise selecting, for the central zone, a conic-section curve to generate spherical aberration in the eye of the patient. In some embodiments, the spherical aberration generated in the eye of the patient is one of a positive, negative or neutral spherical aberration.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
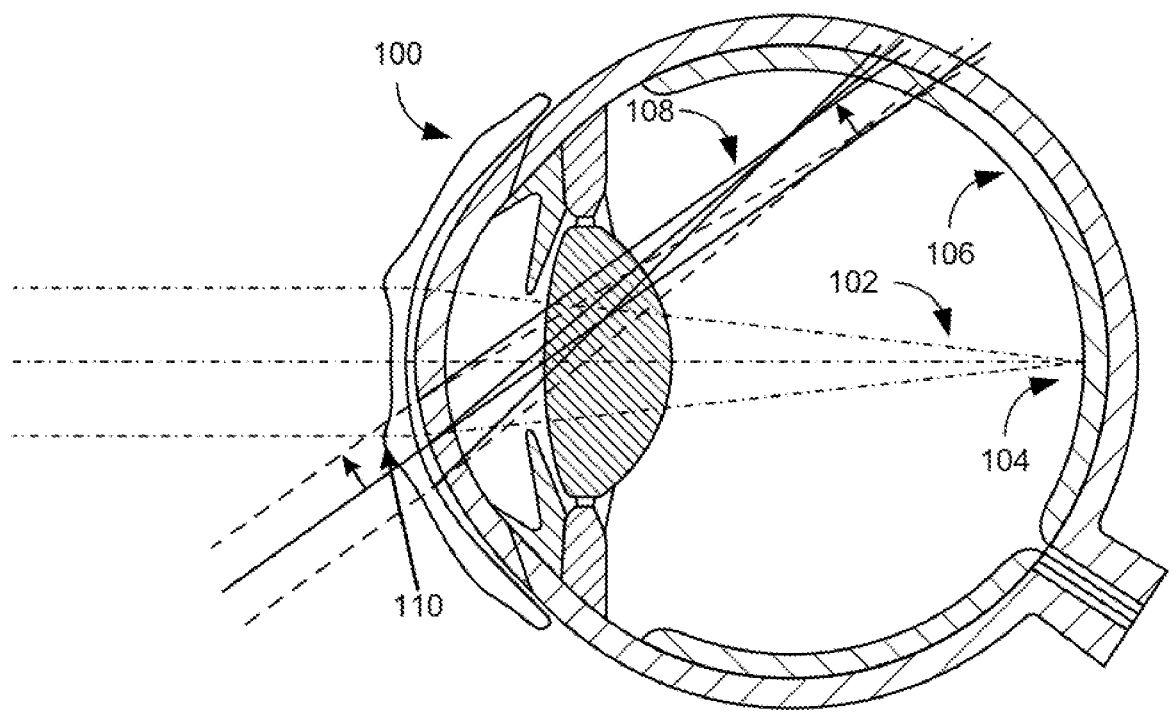
FIG. 1 illustrates the use of a contact lens to introduce pincushion distortion according to some embodiments of the disclosed technologies.

The figures are not exhaustive and do not limit the present disclosure to the precise form disclosed.

DETAILED DESCRIPTION

Myopia, or nearsightedness, is a condition wherein the axial length of the eye is too long, or the crystalline lens is too strong. As a result, the image of a distant object is brought to a focus in front of the retina such that the image is out of focus when the light strikes the retina. The prevalence of myopia is reaching epidemic proportions globally with an incidence of greater than 25% in the United States and Western Europe to as high as 90% in urban China. The incidence of myopia has been shown to be greater in those persons having a college education. In addition, there is a high correlation between the age of commencing concentrated detailed tasks within arm's length and the prevalence and degree of myopia.

Hyperopia, or farsightedness, is a condition wherein the axial length of the eye is too short, or the crystalline lens is too weak. As a result, the image of a distant object is brought to a focus behind the retina such that the image is out of focus when the light strikes the retina.

Embodiments of the disclosed technology control the progression of myopia and reduce hyperopia using lenses that introduce peripheral distortion. In some embodiments, the lenses may control the progression of myopia by introducing pincushion distortion in the peripheral retina. In some embodiments, the lenses may control the progression of hyperopia or reduce the amount of hyperopia by introducing barrel distortion in the peripheral retina. These embodiments may be combined to introduce pincushion distortion in at least one semi-meridian of the peripheral retina, and to introduce barrel distortion in another semi-meridian of the peripheral retina to control astigmatism in an eye. In some embodiments the amount of pincushion distortion introduced may be different in two or more semi-meridians or the amount of barrel distortion introduced may be different in two or more semi-meridians. Although the disclosed technology is discussed primarily with regard to contact lenses, it should be appreciated that the disclosed lenses may be contact lenses, eyeglass lenses, or a combination thereof.

The disclosed embodiments may be combined with contact lens features intended to rotationally stabilize a contact lens on an eye. For example, the different amounts of distortion in two or more semi-meridians may be held in their intended orientation while in place on the eye by use of the features for rotational stabilization. The features for rotational stabilization may include double slab-off, prism ballast, or asymmetric or symmetric thin and thick zones on the anterior surface of the lens, or the like.

The disclosed embodiments may be combined with other techniques to control the progression of myopia and hyperopia. For example, in some embodiments, the lenses may also introduce peripheral defocus. In some embodiments, the lenses may control the progression of myopia by focusing light in front of the peripheral retina. In some embodiments, the lenses may regulate the amount of hyperopia by focusing light behind the peripheral retina.

The disclosed embodiments may be combined with techniques for vision correction. For example, in some embodiments, a central portion of the lenses may also introduce positive and/or negative spherical aberration. In some embodiments, the lenses may control the progression of myopia by introducing positive spherical aberration and focusing light in front of the peripheral retina while light is focused on the central retina. In some embodiments, the lenses may regulate the amount of hyperopia by introducing negative spherical aberration and focusing light behind the peripheral retina while light is focused on the central retina.

The disclosed embodiments may be combined with other techniques to control the progression of myopia and hyperopia. For example, in some embodiments, the lenses may include wavelength specific filtering to alter the spectral transmission of the lens. The filtering may be throughout the full lens or may be in a specific region of the lens for the purpose of directing a specific wavelength of light to a pre-determined region of the lens. In some embodiments, the lenses may include filters to transmit short wavelengths in the visible spectrum to regulate myopia. In some embodiments, the lenses may include filters to transmit long wavelengths in the visible spectrum to regulate hyperopia.

The disclosed embodiments may be combined with other techniques to control the progression of myopia and hyperopia. For example, in some embodiments, the lenses may include light sources to direct light into the eye. The light sources may be regulated to control at least one of the wavelengths, direction, duration, and illuminance of the light. In some embodiments, the wavelengths of the light may include short wavelengths of the visible spectrum as well as near visible ultraviolet wavelengths to regulate myopia. In some embodiments the wavelengths may include long wavelengths of the visible spectrum to regulate hyperopia. In some embodiments the wavelengths of light may be selected to be different for different meridians or semi-meridians of the retina or different areas or regions of the retina to regulate astigmatism. In some embodiments, the lens has a colorant added to the material or surface of the film to alter the spectral transmission of the lens.

The disclosed embodiments may be in the form of spectacle lenses or combined with a spectacle frame. In some embodiments light sources may be placed in the spectacle frame to direct light into the eye. The light sources may be regulated to control at least one of the wavelengths, direction, duration, and illuminance of the light. In some embodiments, the wavelength of the light may include short wavelengths of the visible spectrum as well as near visible ultraviolet wavelengths to regulate myopia. In some embodiments the wavelengths may include long wavelengths of the visible spectrum to regulate hyperopia. In some embodiments the wavelengths of light may be selected to be different for different meridians or semi-meridians of the retina or different areas or regions of the retina to regulate astigmatism.

Figure 2:
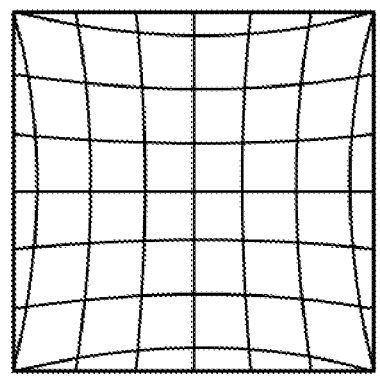
FIG. 2 illustrates pincushion distortion.

FIG. 1 illustrates the use of a contact lens 100 to introduce pincushion distortion according to some embodiments of the disclosed technologies. Pincushion distortion is the distortion of an image such that a straight line appears to be curved convexly toward a point in the image, such as the center of the image, as illustrated in FIG. 2. Referring to FIG. 1, axial emmetropia is illustrated by dotted lines at 102. Axial emmetropia is the refractive state of an eye in which parallel rays of light entering the eye are focused on the macula 104 of the retina 106, creating an image that is sharp and in focus. The axial emmetropia may be created by the contact lens 100, or may be a product of the patient's eye.

In FIG. 1, pincushion distortion is illustrated by broken and solid lines at 108. According to some embodiments of the disclosed technologies, the pincushion distortion may be introduced by one or more features of the contact lens 100. The features may include a thickened portion of the contact lens 100, a thinned portion of the contact lens 100, a material having a different refractive index than an adjacent portion of the contact lens 100, or any combination thereof. In the example of FIG. 1, the features include a thickened portion 110 of the contact lens 100.

The features may form an annulus, introducing pincushion distortion in an annular peripheral region of the retina. The features may form other shapes. The features may introduce different degrees of pincushion distortion in different peripheral portions of the retina.

The degree of pincushion distortion introduced by a feature may be selected by selecting a radial distance of the feature from an optical center of the contact lens 100. Smaller radial distances may increase the degree of introduced pincushion distortion. The optical center of the contact lens 100 may or may not coincide with a geometric center of the contact lens 100. In some embodiments, the optical center may be displaced from the geometric center of the contact lens a predetermined distance to align with the visual axis of an eye when the lens is in place. In some embodiments, the optical center may not align with the visual axis of an eye when the lens is in place.

Figure 3:
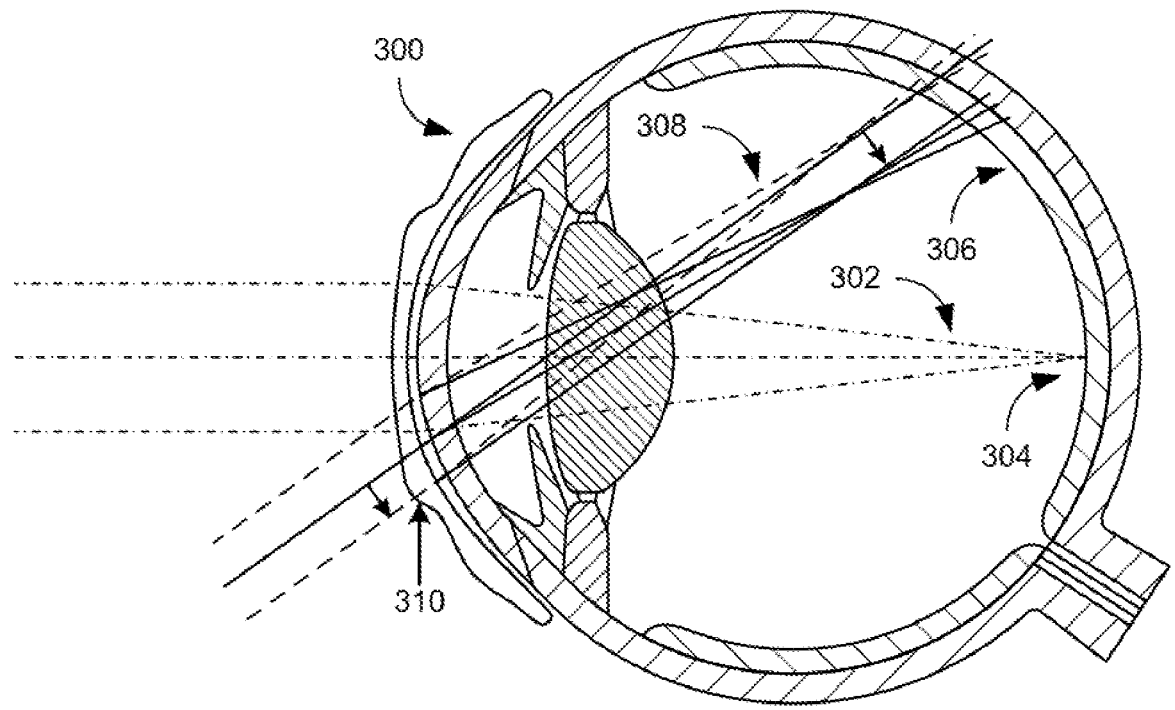
FIG. 3 illustrates the use of a contact lens to introduce barrel distortion according to some embodiments of the disclosed technologies.
Figure 4:
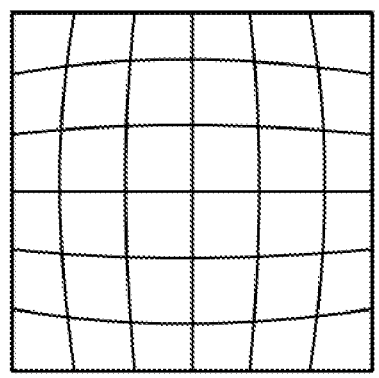
FIG. 4 illustrates barrel distortion.

FIG. 3 illustrates the use of a contact lens 300 to introduce barrel distortion according to some embodiments of the disclosed technologies. Barrel distortion is the distortion of an image such that a straight line appears to be curved convexly away from a point in the image, such as the center of the image, as illustrated in FIG. 4. Referring to FIG. 3, axial emmetropia is illustrated by dotted lines at 302. The axial emmetropia may be created by the contact lens 300, or may be a product of the patient's eye.

In FIG. 3, barrel distortion is illustrated by broken and solid lines at 308. According to some embodiments of the disclosed technologies, the barrel distortion may be introduced by one or more features of the contact lens 300. The features may include a thickened portion of the contact lens 300, a thinned portion of the contact lens 300, a material having a different refractive index than an adjacent portion of the contact lens 300, or any combination thereof. In the example of FIG. 3, the features include a thickened portion 310 of the contact lens 300.

The features may form an annulus, introducing barrel distortion in an annular peripheral region of the retina. The features may form other shapes. The features may introduce different degrees of barrel distortion in different peripheral portions of the retina.

The degree of barrel distortion introduced by a feature may be selected by selecting a radial distance of the feature from an optical center of the contact lens 100. Larger radial distances may increase the degree of introduced barrel distortion. The optical center of the contact lens 100 may or may not coincide with a geometric center of the contact lens 100. In some embodiments, the optical center may be displaced from the geometric center of the contact lens a predetermined distance to align with the visual axis of an eye when the lens is in place. In some embodiments, the optical center may not align with the visual axis of an eye when the lens is in place.

Figure 5:
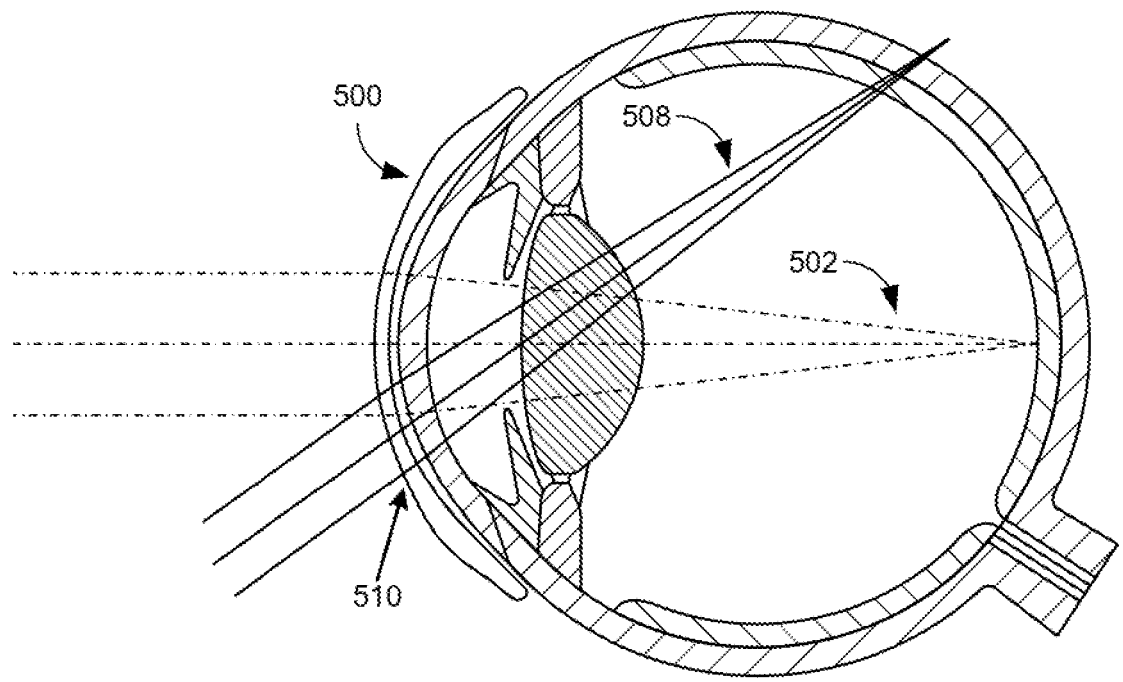
FIG. 5 illustrates the use of a contact lens to introduce peripheral hyperopia.

FIG. 5 illustrates the use of a contact lens 500 to introduce peripheral hyperopia. Referring to FIG. 5, axial emmetropia is illustrated by dotted lines at 502. The axial emmetropia may be created by the contact lens 500, or may be a product of the patient's eye.

In FIG. 5, peripheral hyperopia is illustrated by solid lines at 508. According to some embodiments of the disclosed technologies, the peripheral hyperopia may be introduced by one or more features 510 of the contact lens 500. The features may include a thickened portion of the contact lens 500, a thinned portion of the contact lens 500, a material having a different refractive index than an adjacent portion of the contact lens 500, or any combination thereof. The degree of introduced peripheral hyperopia may be selected by selecting an axial thickness of the feature 510.

The features may form an annulus, introducing peripheral hyperopia in an annular peripheral region of the retina. The features may form other shapes. The features may introduce different degrees of peripheral hyperopia in different peripheral portions of the retina.

Figure 6:
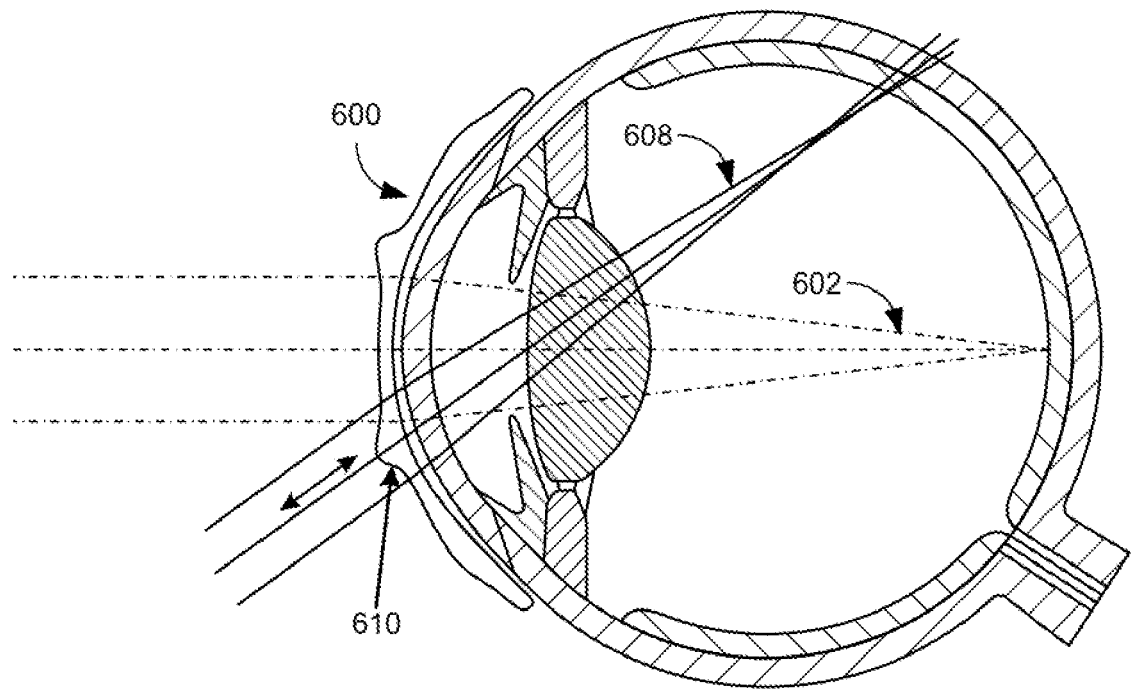
FIG. 6 illustrates the use of a contact lens to introduce peripheral myopia.

FIG. 6 illustrates the use of a contact lens 600 to introduce peripheral myopia. Referring to FIG. 6, axial emmetropia is illustrated by dotted lines at 602. The axial emmetropia may be created by the contact lens 600, or may be a product of the patient's eye.

In FIG. 6, peripheral myopia is illustrated by solid lines at 608. According to some embodiments of the disclosed technologies, the peripheral myopia may be introduced by one or more features 610 of the contact lens 600. The features may include a thickened portion of the contact lens 600, a thinned portion of the contact lens 600, a material having a different refractive index than an adjacent portion of the contact lens 600, or any combination thereof. The degree of introduced peripheral myopia may be selected by selecting an axial thickness of the feature 610.

The features may form an annulus, introducing peripheral myopia in an annular peripheral region of the retina. The features may form other shapes. The features may introduce different degrees of peripheral myopia in different peripheral portions of the retina.

In some embodiments, the features may be arranged to introduce different degrees of peripheral myopia and/or peripheral hyperopia in different peripheral portions of the retina. These embodiments may be designed to regulate astigmatism.

Figure 7:
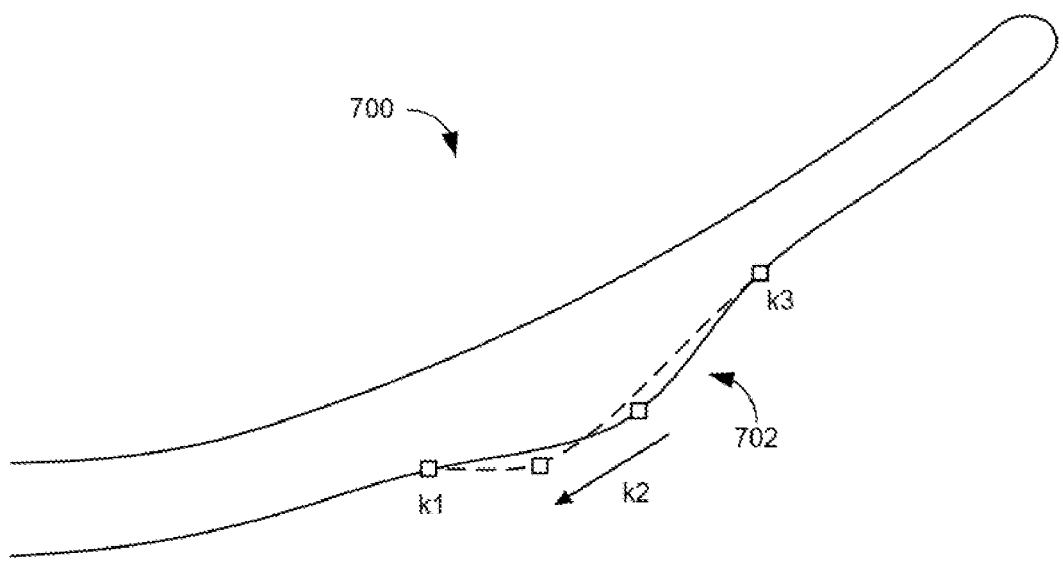
FIG. 7 illustrates a section for a contact lens for introducing peripheral myopia according to some embodiments of the disclosed technologies, both before and after modification to introduce pincushion distortion.

FIG. 7 illustrates a section for a contact lens 700 for introducing peripheral myopia according to some embodiments of the disclosed technologies, both before and after modification to introduce pincushion distortion. Referring to FIG. 7, the contact lens 700 includes a feature 702 for introducing peripheral myopia in the form of a region of increased thickness, as depicted by a solid line. The contour of the anterior surface of the feature 702 may be characterized using spline mathematics by three knots k1, k2, and k3. The knot k2 at the apex of the thickness is referred to herein as the "apical knot". The degree of peripheral myopia introduced by the feature 702 may be selected by selecting the distance of the apical knot k2 from the center of the eye.

Pincushion distortion may be introduced by moving the apical knot k2 toward the optical center of the contact lens 700, as illustrated by the broken line in FIG. 7. The degree of pincushion distortion introduced may be created by selecting the radial distance from the apical knot k2 to the optical center of the lens 700, with decreasing radial distances introducing greater degrees of pincushion distortion. Table 1 provides example parameters for an example contact lens 700 according to FIG. 7.

TABLE 1

| Central Power (Diopters) | Spherical Aberration (microns} | Annular Add Power (Diopters) | K1 semi chord (mm) | K3 semi chord (mm) | K2 semi chord (mm) | Edge semi chord (mm) |
|---|---|---|---|---|---|---|
| −1.00 | 0.15 | 3.00 | 1.75 | 4.75 | 2.50 | 7.20 |

Figure 8:
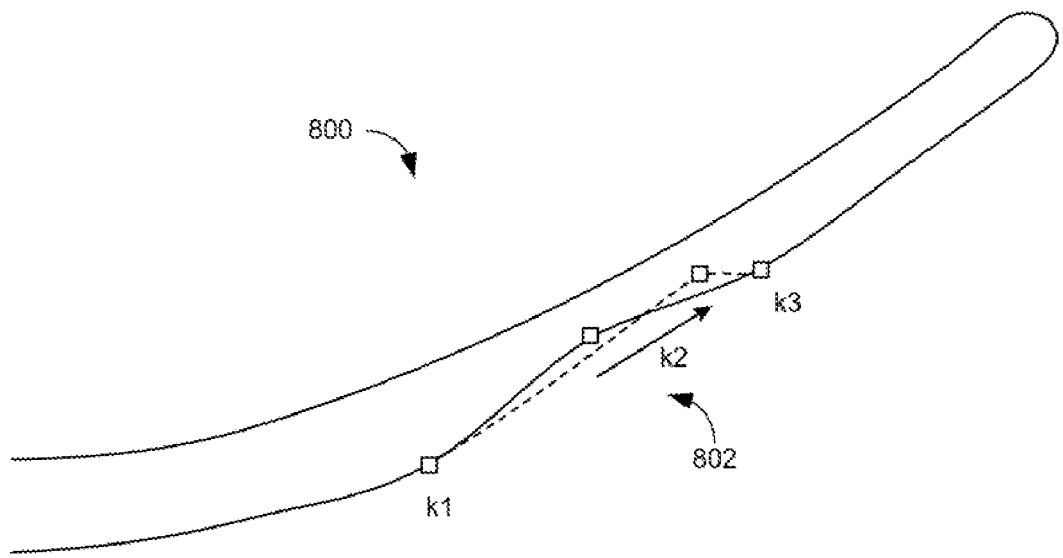
FIG. 8 illustrates a section for a contact lens for introducing peripheral hyperopia according to some embodiments of the disclosed technologies, both before and after modification to introduce pincushion distortion.

FIG. 8 illustrates a section for a contact lens 800 for introducing peripheral hyperopia according to some embodiments of the disclosed technologies, both before and after modification to introduce pincushion distortion. Referring to FIG. 8, the contact lens 800 includes a feature 802 for introducing peripheral hyperopia in the form of a region of decreased thickness, as depicted by a solid line. The contour of the anterior surface of the feature 802 may be characterized using spline mathematics by three knots k1, k2, and k3. The degree of peripheral hyperopia introduced by the feature 802 may be selected by selecting the distance of the apical knot k2 from the center of the eye.

Pincushion distortion may be introduced by moving the apical knot k2 away from the optical center of the contact lens 800, as illustrated by the broken line in FIG. 8. The degree of pincushion distortion introduced may be created by selecting the radial distance from the apical knot k2 to the optical center of the lens 800, with increasing radial distances introducing greater degrees of pincushion distortion.

Figure 9:
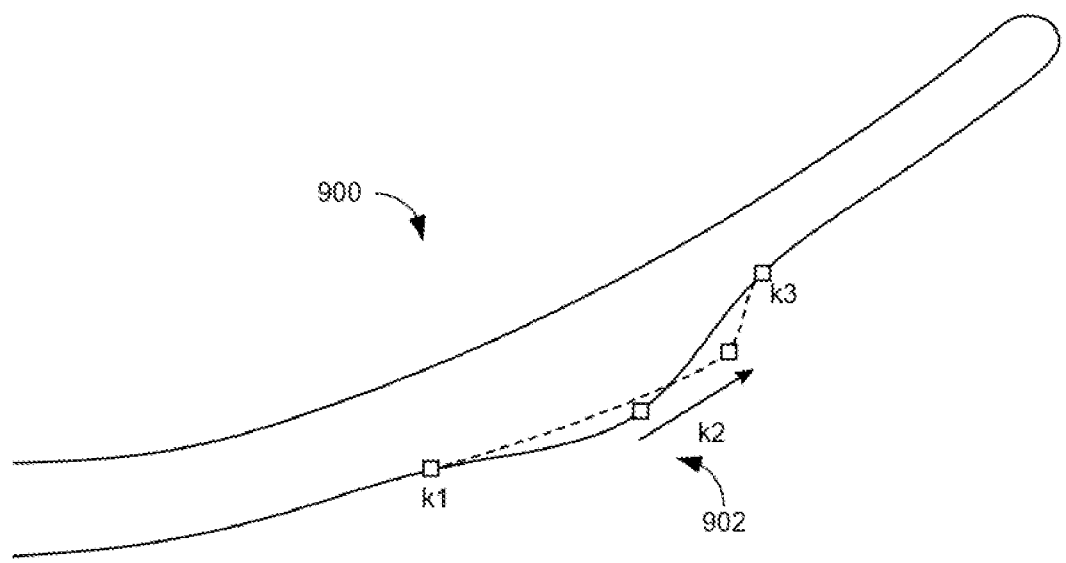
FIG. 9 illustrates a section for a contact lens for introducing peripheral myopia according to some embodiments of the disclosed technologies, both before and after modification to introduce barrel distortion.

FIG. 9 illustrates a section for a contact lens 900 for introducing peripheral myopia according to some embodiments of the disclosed technologies, both before and after modification to introduce barrel distortion. Referring to FIG. 9, the contact lens 900 includes a feature 902 for introducing peripheral myopia in the form of a region of increased thickness, as depicted by a solid line. The contour of the anterior surface of the feature 902 may be characterized using spline mathematics by three knots k1, k2, and k3. The degree of peripheral myopia introduced by the feature 902 may be selected by selecting the distance of the apical knot k2 from the center of the eye.

Barrel distortion may be introduced by moving the apical knot k2 away from the optical center of the contact lens 900, as illustrated by the broken line in FIG. 9. The degree of barrel distortion introduced may be selected by selecting the radial distance from the apical knot k2 to the optical center of the lens 900, with increasing radial distances introducing greater degrees of barrel distortion.

Figure 10:
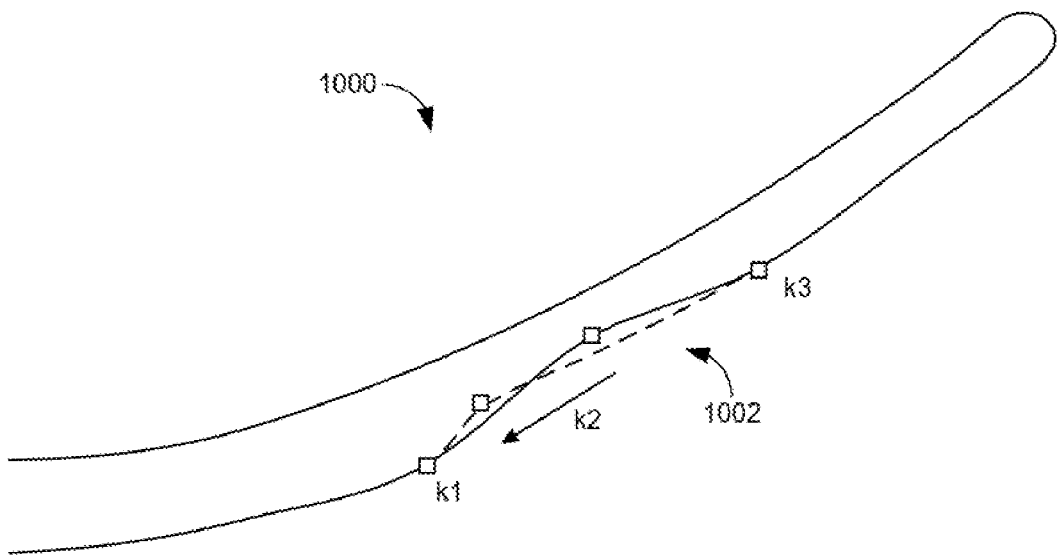
FIG. 10 illustrates a section for a contact lens for introducing peripheral hyperopia according to some embodiments of the disclosed technologies, both before and after modification to introduce barrel distortion.

FIG. 10 illustrates a section for a contact lens 1000 for introducing peripheral hyperopia according to some embodiments of the disclosed technologies, both before and after modification to introduce barrel distortion. Referring to FIG. 10, the contact lens 1000 includes a feature 1002 for introducing peripheral hyperopia in the form of a region of reduced thickness, as depicted by a solid line. The contour of the anterior surface of the feature 1002 may be characterized using spline mathematics by three knots k1, k2, and k3. The degree of peripheral hyperopia introduced by the feature 1002 may be selected by selecting the distance of the apical knot k2 from the center of the eye.

Barrel distortion may be introduced by moving the apical knot k2 toward the optical center of the contact lens 1000, as illustrated by the broken line in FIG. 10. The degree of barrel distortion introduced may be selected by selecting the radial distance from the apical knot k2 to the optical center of the lens 1000, with decreasing radial distances introducing greater degrees of barrel distortion. Table 2 provides example parameters for an example contact lens 1000 according to FIG. 10.

TABLE 2

| Central Power (Diopters) | Spherical Aberration (microns} | Annular Add Power (Diopters) | K1 semi chord (mm) | K3 semi chord (mm) | K2 semi chord (mm) | Edge semi chord (mm) |
|---|---|---|---|---|---|---|
| 3.00 | −0.15 | −3.00 | 1.75 | 4.75 | 2.50 | 7.20 |

In the examples of FIGS. 7-10, the described features may be deployed on the anterior surface of the contact lens, on the posterior surface of the contact lens, or both.

Figure 11:
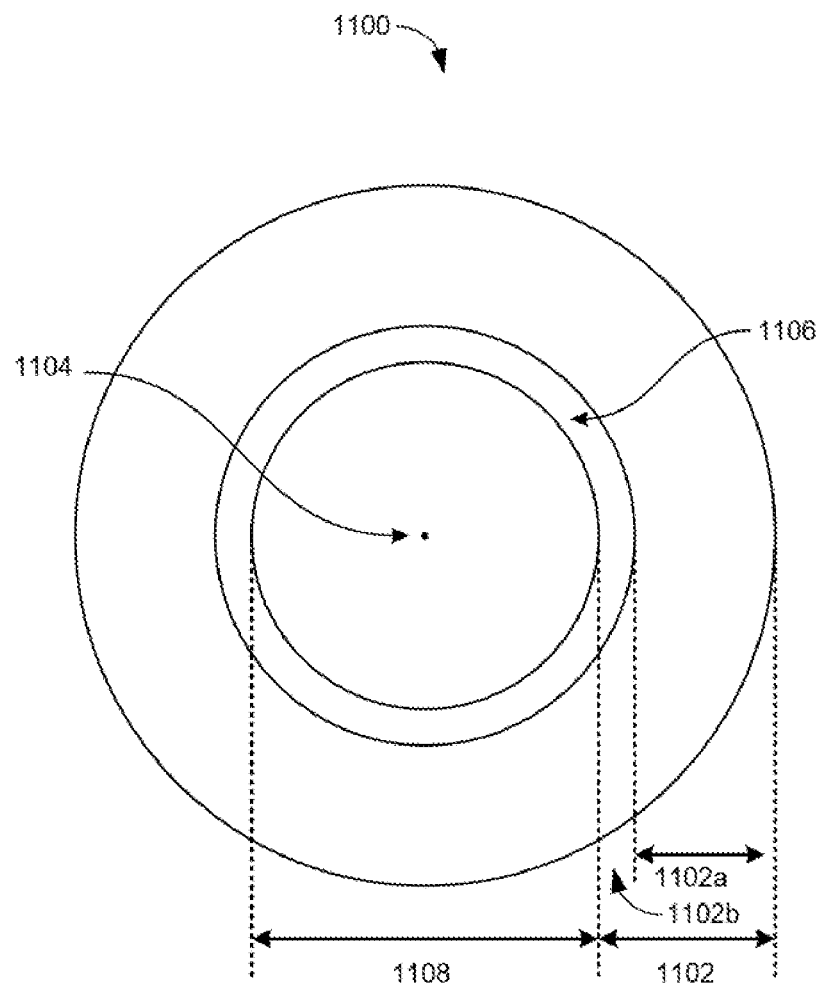
FIG. 11 illustrates a contact lens where the features take an annular form, and may be composed of a material having a different refractive index than the body of the contact lens, according to some embodiments.

As noted above, the features may take an annular form, and may be composed of a material having a different refractive index than the body of the contact lens. FIG. 11 illustrates a contact lens 1100 according to one such embodiment. Referring to FIG. 11, the contact lens 1100 includes a peripheral zone 1102 and a central zone 1108 having an optical center 1104. The peripheral zone includes a first zone 1102a and a second zone 1102b. An annular feature 1106 within the second zone 1102b may have a different refractive index than that of the first zone 1102a. The radial distance of the annular feature 1106 from the optical center 1104 may be selected to introduce selected degrees of pincushion distortion and barrel distortion. Cross-sectional shapes of the annular feature 1106 may also be selected to introduce selected degrees of pincushion distortion and barrel distortion. The cross-sectional shapes may be biconvex, single convex, biconcave, single concave or meniscus.

Figure 12:
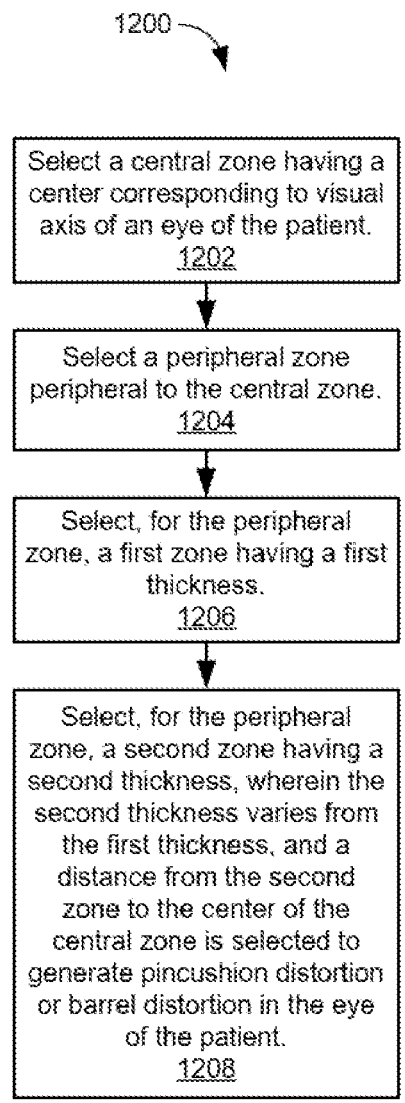
FIG. 12 is a flowchart illustrating an overview process for defining a lens to be manufactured for an eye of a patient according to some embodiments of the disclosed technologies.

FIG. 12 is a flowchart illustrating an overview process 1200 for defining a lens to be manufactured for an eye of a patient according to some embodiments of the disclosed technologies. One or more parts of the process 1200 may be performed by a computer. The computer may be implemented, for example, as describe below with reference to FIG. 14. Again, although the disclosed technology is discussed primarily with regard to contact lenses, it should be appreciated that the disclosed lenses may be contact lenses, eyeglass lenses, or a combination thereof.

The elements of the process 1200 are presented in one arrangement. However, it should be understood that one or more elements of the process may be performed in a different order, in parallel, omitted entirely, and the like. Furthermore, the process 1200 may include other elements in addition to those presented.

Referring to FIG. 12, the process 1200 may include selecting a central zone having a center corresponding to visual axis of an eye of the patient, at 1202. In the example of FIG. 11, the central zone 1108 may be selected.

Referring again to FIG. 12, the process 1200 may include selecting a peripheral zone peripheral to the central zone, at 1204. In the example of FIG. 11, the peripheral zone 1102 may be selected.

Referring again to FIG. 12, the process 1200 may include selecting, for the peripheral zone, a first zone having a first thickness, at 1206. In the example of FIG. 11, the first zone 1102a may be selected.

Referring again to FIG. 12, the process 1200 may include selecting, for the peripheral zone, a second zone having a second thickness, wherein the second thickness varies from the first thickness, and a distance from the second zone to the center of the central zone is selected to generate pincushion distortion or barrel distortion in the eye of the patient, at 1208. In the example of FIG. 11, the second zone 1102b may be selected.

Figure 13:
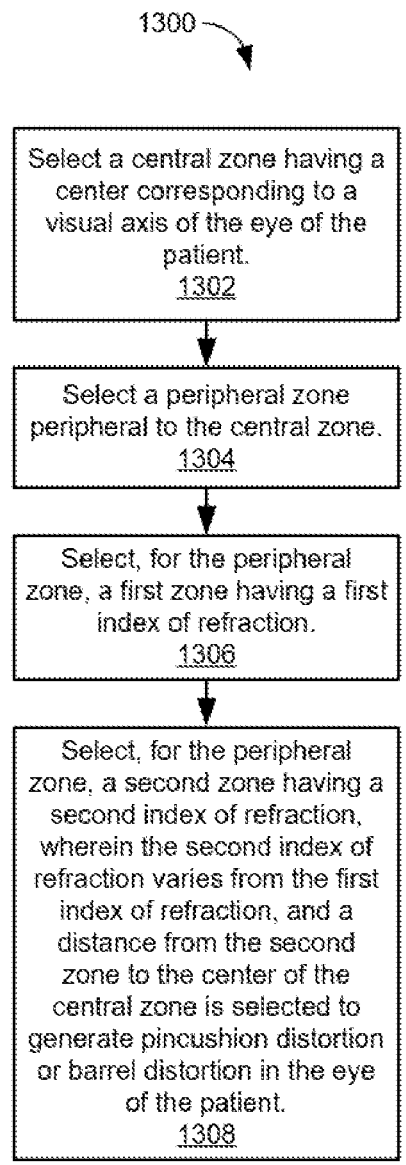
FIG. 13 is a flowchart illustrating an overview process for defining a lens to be manufactured for an eye of a patient according to some embodiments of the disclosed technologies.

FIG. 13 is a flowchart illustrating an overview process 1300 for defining a lens to be manufactured for an eye of a patient according to some embodiments of the disclosed technologies. One or more parts of the process 1300 may be performed by a computer. The computer may be implemented, for example, as describe below with reference to FIG. 14. Again, although the disclosed technology is discussed primarily with regard to contact lenses, it should be appreciated that the disclosed lenses may be contact lenses, eyeglass lenses, or a combination thereof.

The elements of the process 1300 are presented in one arrangement. However, it should be understood that one or more elements of the process may be performed in a different order, in parallel, omitted entirely, and the like. Furthermore, the process 1300 may include other elements in addition to those presented.

Referring to FIG. 13, the process 1300 may include selecting a central zone having a center corresponding to a visual axis of the eye of the patient, at 1302. An example of FIG. 11, the central zone 1104 may be selected.

Referring again to FIG. 13, the process 1300 may include selecting a peripheral zone peripheral to the central zone, at 1304. In the example of FIG. 11, the peripheral zone 1102 may be selected.

Referring to FIG. 13, the process 1300 may include selecting, for the peripheral zone, a first zone having a first index of refraction, at 1306. An example of FIG. 11, the first zone 1102a may be selected.

Referring to FIG. 13, the process 1300 may include selecting, for the peripheral zone, a second zone having a second index of refraction, wherein the second index of refraction varies from the first index of refraction, and a distance from the second zone to the center of the central zone is selected to generate pincushion distortion or barrel distortion in the eye of the patient, at 1308. In the example of FIG. 11, the second zone 1102b may be selected.

The disclosed lenses may be fabricated in any manner. For example, the lenses may be fabricated as molded soft contact lenses. The lenses may be made just in time by mold selection or rapid mold making. The lenses may be an inventory product that is picked and shipped to an order. The lenses may be made from using a cutting file method where each lens is custom manufactured by diamond turning. The lenses may be made by material removal with lasers or other means. The lenses may be made by material addition by 3D printing or other means.

The material addition may be in the form of a flexible lens or film having the optical distortion features, where the film may be added to a pre-fabricated spectacle lens. In some embodiments the film may be applied to any spectacle lens to produce the optical distortions described herein. The film may also include at least one of spherical aberration correction in the central zone, peripheral defocus optical elements, wavelength specific filters, or light sources in the peripheral zone in addition to the optical distortion of the present invention. In some embodiments, the flexible lens element has a colorant added to the material or surface of the film to alter the spectral transmission of the flexible lens element. In some embodiments the film may be injection molded of aliphatic thermoplastic polyurethane or materials having similar elastomeric properties. Other materials and means of manufacturing may be used.

Figure 14:
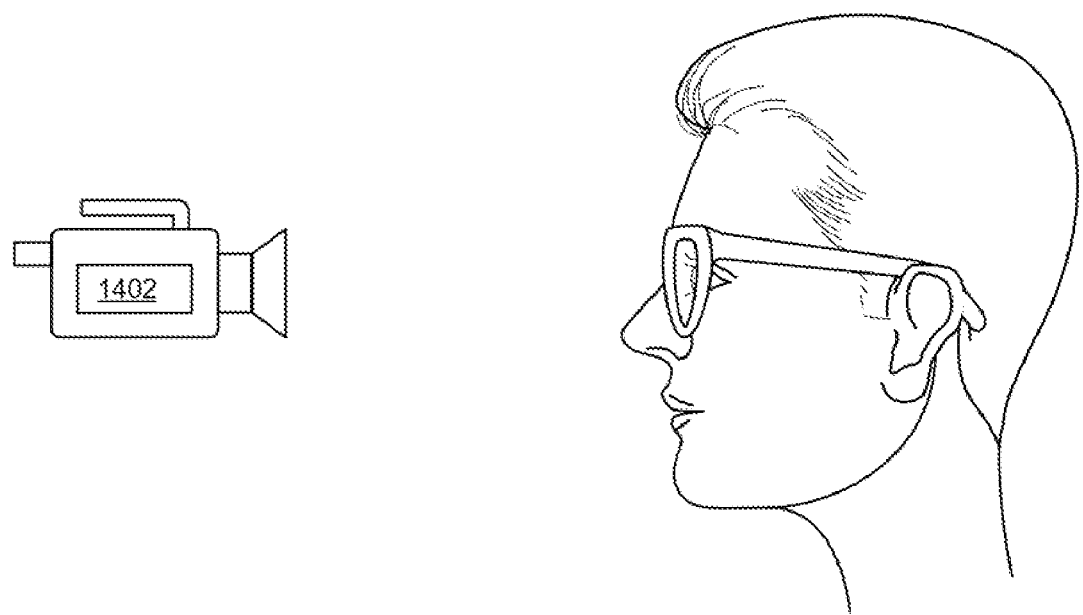
FIG. 14 illustrates the capture of an image of an eye of a patient and a lens opening in a spectacle frame while the gaze of the patient is held in a straight-ahead line of sight according to some embodiments of the disclosed technologies.

The film may be measured and then applied to a pre-fabricated spectacle lens. A spectacle frame with or without such a pre-fabricated spectacle lens may be positioned on the face of the patient. An image of the lens opening in the frame and the eye may be captured while the gaze of the patient is held in a straight-ahead line of sight. FIG. 14 illustrates the capture of such an image according to some embodiments of the disclosed technologies. Referring to FIG. 14, a camera 1402 captures an image of an eye and a lens opening in a spectacle frame 1406 while the gaze of the patient is held in a straight-ahead line of sight. The visual axis may be identified in the image as the center of the pupil or about 5 degrees nasal to the center of the pupil. The perimeter of the lens edge may be identified in the image. The camera may obtain images of the patient wearing the spectacle frame, where the image including a lens opening of the spectacle frame and a corresponding eye of the patient. The perimeter of the lens opening of the spectacle frame may be determined based on the image. An optical center within the lens opening of the spectacle frame may be determined based on the location of the pupil of the eye in the image.

Controlling a cutting system to cut a flexible lens element according to the determined perimeter of the lens opening and the determined optical center within the lens opening to prepare the flexible lens element for application to a spectacle lens for the spectacle frame.

The film containing the optical distortion feature, along with any other of the disclosed elements, may be placed on a stage, placing the optical center of the central zone of the film at a reference location. The film may include orientation marks that represent the angular orientation of meridional or semi-meridional variances in at least one of central power, spherical aberration, peripheral defocus, or the disclosed optical distortion features. The film having the orientation marks may be placed on the stage respective to the angle of the meridian of the meridional or semi-meridional variance feature by way of an angular protractor image on the stage or the like.

Figure 15:
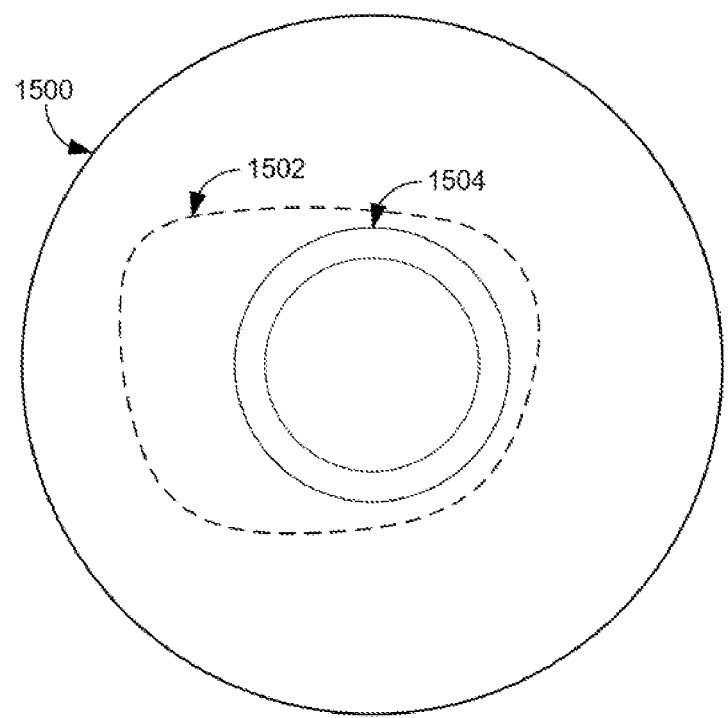
FIG. 15 illustrates the identification of the perimeter of a lens edge and lens optical center according to some embodiments of the disclosed technologies.
Figure 16:
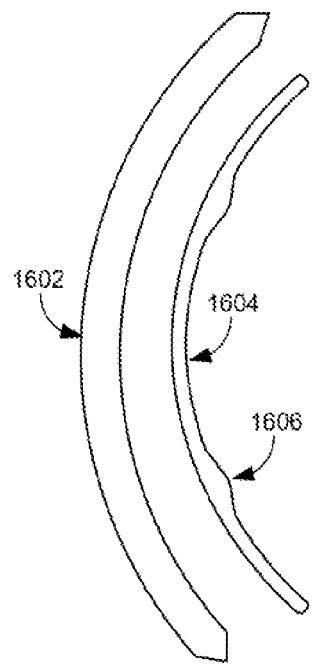
FIG. 16 illustrates application of a film defined according to some embodiments of the disclosed technologies to a spectacle lens.
Figure 17:
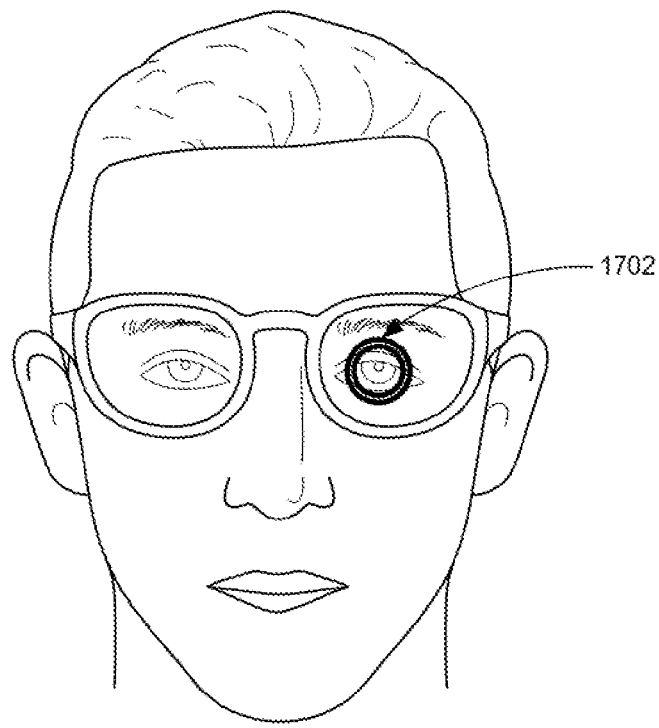
FIG. 17 illustrates a patient wearing the completed spectacles according to some embodiments of the disclosed technologies.

A cutting system, for example such as a computer numerically controlled system, may cut the perimeter of the film to the size and shape of the perimeter of the lens. For example, a computer system may control a cutting system to cut the flexible lens element according to the determined perimeter of the lens opening and the determined optical center within the lens opening to prepare the flexible lens element for application to a spectacle lens for the spectacle frame. FIG. 15 illustrates a precut film 1500 according to some embodiments of the disclosed technologies. Referring to FIG. 15, the perimeter of the spectacle lens edge is indicated at 1502, and an optical distortion feature is indicated at 1504. The film may be pressed onto the surface of the spectacle lens while matching the perimeter of the film to the perimeter of the spectacle lens. FIG. 16 illustrates application of a film defined according to some embodiments of the disclosed technologies to a spectacle lens. Referring to FIG. 16, a spectacle lens 1602 and film 1604 are shown in cross-section. Also shown is an optical distortion feature 1606 of the film 1604. The system and method may produce a spectacle lens and film combination with the optical center of the central zone at the location of the visual axis of the patient when the frame with the spectacle lens and film with the optical distortion feature with or without other elements is positioned on the face. Example techniques for applying such a film to a spectacle lens are described in U.S. Pat. Nos. 7,934,831 and 6,170,952. FIG. 17 illustrates a patient wearing the completed spectacles, with an optical distortion feature indicated at 1702.

Fabrication of the lenses may include changing the index of refraction of a material in a region to change the power of the lens by exposure with a certain wavelength of electromagnetic radiation. The power may be changed by directing the radiation to a zone of the lens that is made of material capable of changing in index of refraction when exposed to a predetermined wavelength of electromagnetic radiation. The index may be changed to produce a desired peripheral defocus and peripheral distortion pattern.

Some or all of the techniques disclosed for the lenses may be employed with the disclosed films. As one example, the processes of FIGS. 12 and 13 may be employed to define the films.

Figure 18:
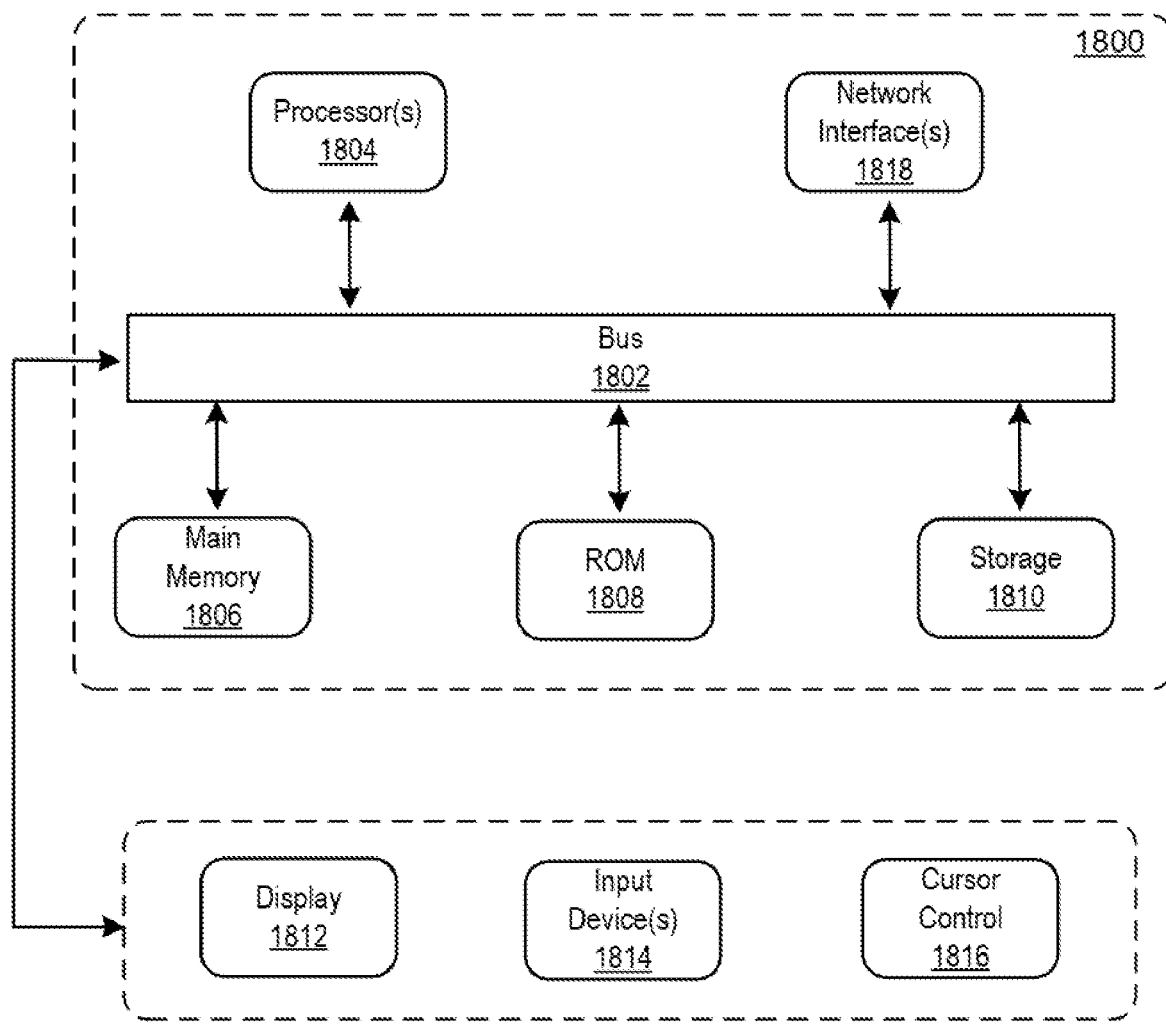
FIG. 18 depicts a block diagram of an example computer system in which embodiments described herein may be implemented.

FIG. 18 depicts a block diagram of an example computer system 1800 in which embodiments described herein may be implemented. The computer system 1800 includes a bus 1802 or other communication mechanism for communicating information, one or more hardware processors 1804 coupled with bus 1802 for processing information. Hardware processor(s) 1804 may be, for example, one or more general purpose microprocessors.

The computer system 1800 also includes a main memory 1806, such as a random access memory (RAM), cache and/or other dynamic storage devices, coupled to bus 1802 for storing information and instructions to be executed by processor 1804. Main memory 1806 also may be used for storing temporary variables or other intermediate information during execution of instructions to be executed by processor 1804. Such instructions, when stored in storage media accessible to processor 1804, render computer system 1800 into a special-purpose machine that is customized to perform the operations specified in the instructions.

The computer system 1800 further includes a read only memory (ROM) 1808 or other static storage device coupled to bus 1802 for storing static information and instructions for processor 1804. A storage device 1810, such as a magnetic disk, optical disk, or USB thumb drive (Flash drive), etc., is provided and coupled to bus 1802 for storing information and instructions.

The computer system 1800 may be coupled via bus 1802 to a display 1812, such as a liquid crystal display (LCD) (or touch screen), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. In some embodiments, the same direction information and command selections as cursor control may be implemented via receiving touches on a touch screen without a cursor.

The computing system 1800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1800 may implement the techniques described herein using customized hard-wired logic, one or more ASICs or FPGAs, firmware and/or program logic which in combination with the computer system causes or programs computer system 1800 to be a special-purpose machine. According to one embodiment, the techniques herein are performed by computer system 1800 in response to processor(s) 1804 executing one or more sequences of one or more instructions contained in main memory 1806. Such instructions may be read into main memory 1806 from another storage medium, such as storage device 1810. Execution of the sequences of instructions contained in main memory 1806 causes processor(s) 1804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1810. Volatile media includes dynamic memory, such as main memory 1806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1802. Transmission media can also take the form of acoustic or light waves, such as those generated during radio-wave and infra-red data communications.

The computer system 1800 also includes a communication interface 1818 coupled to bus 1802. Network interface 1818 provides a two-way data communication coupling to one or more network links that are connected to one or more local networks. For example, communication interface 1818 may be an integrated services digital network (ISDN) card, cable modem, satellite modem, or a modem to provide a data communication connection to a corresponding type of telephone line. As another example, network interface 1818 may be a local area network (LAN) card to provide a data communication connection to a compatible LAN (or a WAN component to communicate with a WAN). Wireless links may also be implemented. In any such implementation, network interface 1818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1818, which carry the digital data to and from computer system 1800, are example forms of transmission media.

The computer system 1800 can send messages and receive data, including program code, through the network (s), network link and communication interface 1818. In the Internet example, a server might transmit a requested code for an application program through the Internet, the ISP, the local network and the communication interface 1818.

The received code may be executed by processor 1804 as it is received, and/or stored in storage device 1810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A lens comprising:
a central zone having an optical center corresponding to the visual axis of an eye of a patient; and
a peripheral zone peripheral to the central zone and the peripheral zone comprising:
a first zone having a first thickness, and
a second zone having a second thickness and an apical knot, wherein:
the second thickness varies from the first thickness, and
a radial distance from the apical knot of the peripheral zone to the optical center of the central zone is selected to generate pincushion distortion or barrel distortion in the eye of the patient; and
the radial distance of the apical knot of the second thickness of the peripheral zone generates pincushion or barrel distortion.

2. The lens of claim 1, wherein the peripheral zone comprises at least one of:
a raised area on an anterior surface of the lens;
a raised area on a posterior surface of the lens;
a depressed area on an anterior surface of the lens; or
a depressed area on a posterior surface of the lens.

3. The lens of claim 1, wherein:
the second thickness is selected to generate peripheral defocus in the eye of the patient.

4. The lens of claim 1, wherein:
the lens is rotationally stabilized to allow for at least one of:
different optical powers in two or more semi-meridians;
different spherical aberration generated in two or more semi-meridians;
different peripheral defocus in two or more semi-meridians; or
different rectilinear distortion in two or more semi-meridians.

5. The lens of claim 1, wherein:
the radial distance of the apical knot of the peripheral zone to the center of the central zone is selected to generate different amounts of pincushion distortion or barrel distortion in the eye of the patient in two or more semi-meridians.

6. The lens of claim 1, wherein:
the lens has a colorant added to a material or surface of a film to alter the spectral transmission of the lens.

7. A lens comprising:
a central zone having an optical center corresponding to the visual axis of an eye of a patient; and
a peripheral zone peripheral to the central zone and the peripheral zone comprising:
a first zone having a first index of refraction, and
a second zone having a second index of refraction and an apical knot, wherein:
the second index of refraction varies from the first index of refraction, and
a radial distance from the apical knot of the peripheral zone to the optical center of the central zone is selected to generate pincushion distortion or barrel distortion in the eye of the patient; and
the radial distance of the apical knot of the second thickness of the peripheral zone generates pincushion or barrel distortion.

8. A method for defining a lens to be manufactured for an eye of a patient, the method comprising:
selecting a central zone having an optical center corresponding to the visual axis of an eye of the patient;
selecting a peripheral zone peripheral to the central zone; and
selecting, for the peripheral zone:
a first zone having a first thickness, and
a second zone having a second thickness and an apical knot, wherein:
the second thickness varies from the first thickness, and
a radial distance from the apical knot of the peripheral to the optical center of the central zone is selected to generate pincushion distortion or barrel distortion in the eye of the patient; and
the radial distance of the apical knot of the second thickness of the peripheral zone generates pincushion or barrel distortion.

9. The method of claim 8, further comprising:
selecting, for the peripheral zone, at least one of:
a raised area on an anterior surface of the lens;
a raised area on a posterior surface of the lens;
a depressed area on an anterior surface of the lens; or
a depressed area on a posterior surface of the lens.

10. The method of claim 8, further comprising:
rotationally stabilizing the lens to allow for at least one of:
different optical powers in two or more semi-meridians;
different spherical aberration generated in two or more semi-meridians;
different peripheral defocus in two or more semi-meridians; or
different ocular distortion in two or more semi-meridians.

11. The method of claim 8, further comprising:
selecting the radial distance of the apical knot of the peripheral zone to the center of the central zone to generate different amounts of pincushion distortion or barrel distortion in the eye of the patient in two or more semi-meridians.

* * * * *